United States Patent [19]

Roberts

[11] 4,176,737

[45] Dec. 4, 1979

[54] DRIVE MECHANISM

[75] Inventor: Richard W. Roberts, Lombard, Ill.

[73] Assignee: Borg-Warner Corporation, Chicago, Ill.

[21] Appl. No.: 853,164

[22] Filed: Nov. 21, 1977

[51] Int. Cl.² .................. F16D 43/25; F16D 13/08
[52] U.S. Cl. .................. 192/82 T; 192/81 C
[58] Field of Search ............. 192/81 C, 82 T

[56] References Cited

U.S. PATENT DOCUMENTS

| 2,381,567 | 8/1945 | Bonham | 192/82 T |
|---|---|---|---|
| 2,438,161 | 3/1948 | Greenlee | 192/82 T |
| 2,516,269 | 7/1950 | Starkey | 192/82 T |
| 2,570,515 | 10/1951 | Bonham | 192/82 T |
| 3,268,042 | 8/1966 | Sargeant et al. | 192/82 T X |
| 3,730,151 | 5/1973 | Smith et al. | 192/82 T X |
| 3,913,713 | 10/1975 | F'Geppert | 192/82 T X |

Primary Examiner—Allan D. Herrmann
Attorney, Agent, or Firm—Robert L. Zieg

[57] ABSTRACT

A thermally responsive clutch for connecting a driving shaft to a driven pulley including cylindrical clutch surfaces on the shaft and the pulley with a wrapping coil spring in engagement with both surfaces. An engaging pawl is mounted adjacent said spring clutch element and a pair of thermally responsive bimetallic washers in contact with said pawl act to cause said pawl to cause said spring to connect said shaft and pulley only within a predetermined temperature range.

6 Claims, 4 Drawing Figures

DRIVE MECHANISM

BACKGROUND OF THE INVENTION

I. This invention pertains to the field of thermally responsive clutch devices.

II. Within the prior art it is known to have clutches that respond to a predetermined temperature to connect or disconnect the drive mechanism. In particular for example, U.S. Pat. No. 2,381,567 discloses a clutch actuating device for a fan mechanism in which a temperature responsive spring will act to engage the clutch when a predetermined temperature is exceeded. None of the devices in the prior art provide a reasonable solution to having a clutch operate only within a predetermined desired temperature range. In particular, the prior art presents complicated solutions involving hydraulic and electric clutches to engage and disengage when desired. Further, the majority of the prior art uncovered with regard to this invention, relates to devices for driving a vehicle fan or cooling device in which provision is made to engage the drive of the fan only when a predetermined temperature is exceeded.

It has been found that one of the needs in the field of accessory drives for vehicle engines, and in particular, drives to an air conditioning compressor for a vehicle, it is desired to operate such compressor only within a desired temperature range. When the range is exceeded it is an indication serious trouble has developed, as for example, loss of lubrication which will destroy the compressor and the drive must be disengaged immediately. In addition, a simple device is required to provide for disengagement of the drive to the compressor when the temperature is below the given range, since at this time it is unnecessary to drive the compressor since the passenger compartment will not need cooling, and a certain amount of inefficiency otherwise results even when a controlled displacement is used.

SUMMARY OF THE INVENTION

The present invention solves the above stated problems in the field by providing a simple mechanically operated clutch which will serve to connect the drive between a shaft and pulley to drive a compressor only within a predetermined temperature range. Uniquely, a pair of bimetallic, thermally responsive washers are used to actuate an engaging pawl, which provides for engagement of a wrapping coil spring clutch when the pawl is moved radially outwardly to connect the driving shaft and a driven pulley. One of the bimetallic washers responds to temperatures above a predetermined range to force disengagement of the pawl to deactivate the clutch, and the other of the bimetallic washers, responds to temperatures below the predetermined range to activate the pawl to likewise remove it from engagement with the coil spring clutch to disengage the drive.

DETAILED DESCRIPTION OF THE PREFERRED EMBODIMENT

Figure 1:
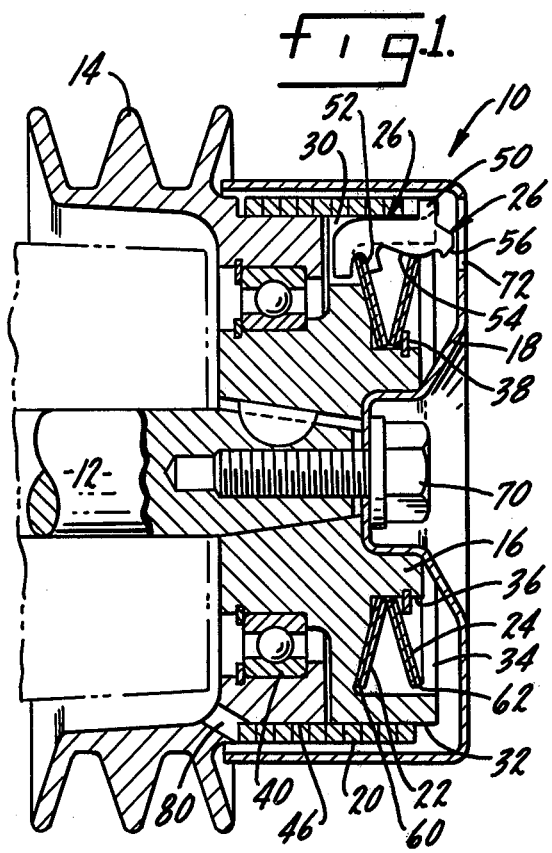
FIG. 1 shows a cross-sectional view through a drive mechanism embodying the principles of the present invention.
Figure 2:
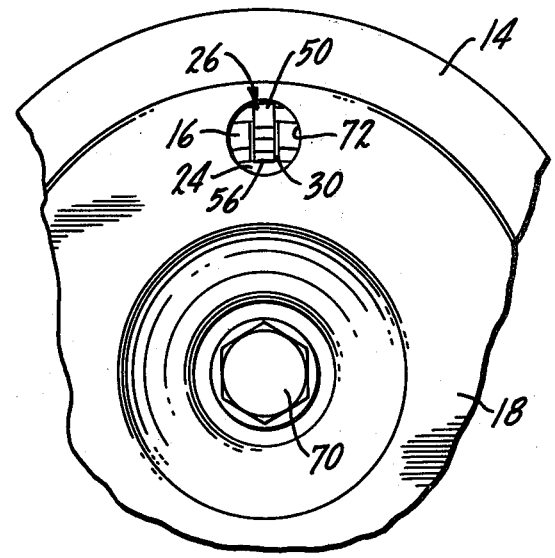
FIG. 2 is an end view of a portion of the mechanism of FIG. 1.
Figure 3:
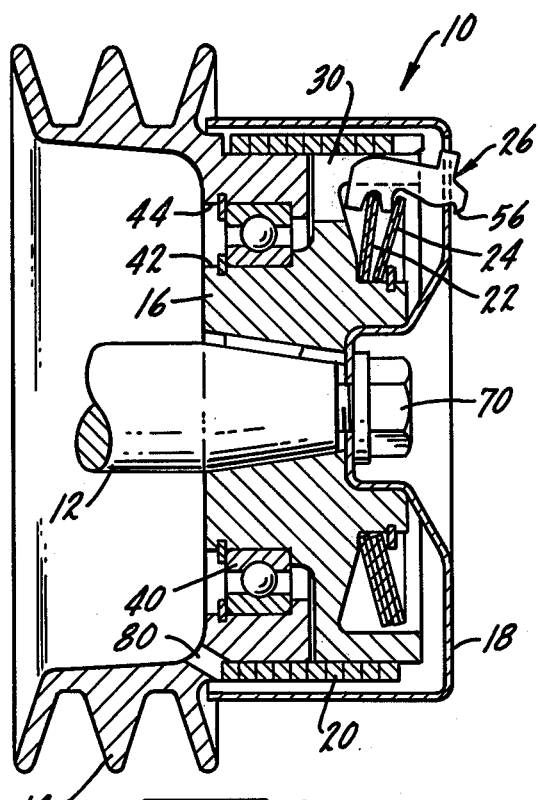
FIG. 3 is a further view of the mechanism of FIG. 1 showing the drive in a disconnected position when the temperature exceeds a predetermined range.
Figure 4:
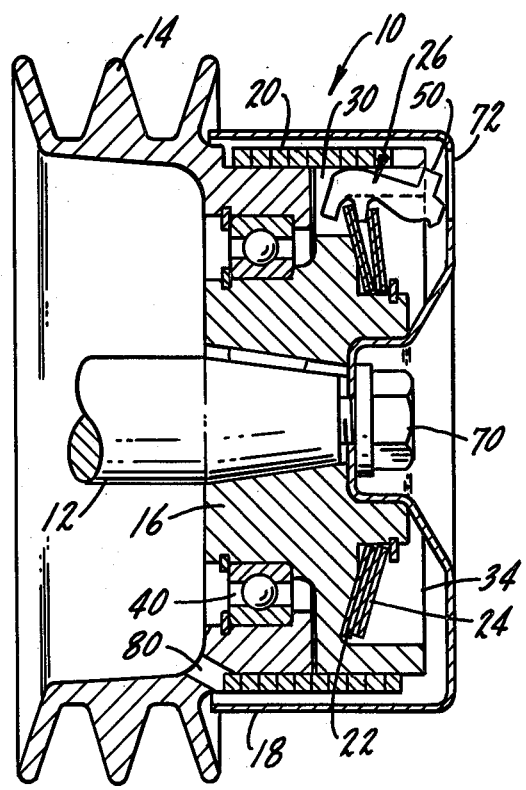
FIG. 4 shows an additional view of the mechanism of FIG. 1 showing how the drive is disconnected when the temperature is below a predetermined range.

Drive mechanism 10 of the present invention is shown in three operating conditions in FIGS. 1, 3 and 4. Drive mechanism 10 is comprised generally of a driving shaft 12, a driven pulley 14, a driving hub 16, a cover 18, a wrapping coil spring clutch element 20, a pair of bimetallic washers 22 and 24, and clutch engaging element or pawl 26.

Driving shaft 12 has attached thereto the hub 16. Driving hub 16 has a slot 30 therein which receives engaging pawl 26. Further, hub 16 has a smooth cylindrical clutch surface 32. Hub 16 has a counter-bore 34 therein which receives bimetallic washers 22 and 24. Washers 22 and 24 are mounted on a cylindrical surface 36 and held thereon by a snap ring 38. The external edges of washers 22 and 24 are in engagement with pawl 26 as will be described below.

Mounted adjacent hub 16 is the driven pulley member 14. Pulley 14 is mounted on a ball bearing 40 which is mounted on a cylindrical surface 42 of hub 16. Pulley 14 has an internal bore 44 to receiving bearing 40. Pulley member 14 further has a smooth cylindrical clutch surface 46 thereon which is coaxial and concentric with surface 32 on hub 16. The wrapping coil spring 20 engages surfaces 46 and 32.

Pawl 26 has a radially extending finger 50 thereon and has further an inner groove 52, a cam surface 54 and a latch finger 56. The external edge 60 of washer 22 engages in groove 52 of pawl 26. The external edge 62 of washer 24 is adapted to engage cam surface 54 on pawl 26 as will be explained below.

Connected to shaft 12 by a bolt 70 is the sheet metal cover 18 for the device. Cover 18 serves to retain coil spring 20 within the assembly. Further, cover 18 has a hole 72 therein in the area of pawl 26. In addition, there is provided in pulley member 14 one or more lubrication holes 80 which extend therethrough to the area of clutch surface 46 to provide means for supplying lubricant to clutch surfaces 46, 32 and coil spring 20.

As explained above, FIGS. 1, 3 and 4 show the clutch 10 in three modes of operation. In general, the purpose of the clutch is to provide for driving engagement of shaft 12 with pulley 14 within a given temperature range. As for example, above 40° and below 350°. These ranges are appropriate, for example, where pulley 14 is driving a controlled displacement compressor for an air conditioning system for an automobile. In this use it is desired that the driving connection to the pulley be maintained only within the temperature range as given above. When the temperature is above 350°, this would indicate serious trouble in the compressor, as for example, when the refrigerant charge is lost, which means loss of lubricant in the compressor. Thus the drive is to be disconnected before the excessive heat condition destroys the compressor. Further, in the controlled displacement compressor it will be appreciated that a certain amount of inefficiency is provided in the system even when the compressor is not working to cool the vehicle, and thus it is desirable below a certain minimum temperature to disengage the drive to the compressor. Thus the present compressor drive is adapted to disconnect the drive to the compressor when the ambient temperature is below a predetermined minimum and above a predetermined maximum.

FIG. 1 shows the normal condition of the compressor within the predetermined temperature range in which bimetallic washers 22 and 24 are in the positions illustrated in FIG. 1, diverging from one another at the outer diameter thereof. In this condition, the outer edge of washer 24 is in engagement with pawl 26, holding the pawl in an outer radial position in which finger 50 is engaging an end of coil spring 20 causing same to wrap on clutch surfaces 46 and 32 and thus drivingly connect pulley 14 and hub 16.

Referring to FIG. 3, the condition is illustrated where the temperature would exceed 350° or another predetermined maximum. In this condition, bimetallic washer 24 remains in its position. Bimetallic washer 22 has snapped over in response to temperature such that the outer edge of same is moved toward the outer edge of bimetallic washer 24. Under this condition, the pawl 26 is moved axially along the slot 30 to a position as illustrated in FIG. 3 extending through hole 72 in cover 18. When this is accomplished, latch finger 56 will engage cover 18 to hold the pawl in this position in which the clutch is disengaged. When the temperature drops back below 350°, bimetallic washer 22 tries to return to the position illustrated in FIG. 1. When the temperature drops back below 350° bimetallic wahser 22 tries to return to the position illustrated in FIG. 1. However, the pawl remains latched to the cover 18 and provides visual evidence that the compressor has exceeded 350°. The compressor should then be disassembled and repaired before reassembling the pulley as shown in FIG. 1.

When the temperature drops below 40°, bimetallic washer 22 remains in the position illustrated in FIG. 1, but bimetallic washer 24 snaps over to the position illustrated in FIG. 4, in which the outer edge thereof has moved toward the outer edge of bimetallic washer 22. This movement removes the outer edge of bimetallic washer 24 from engagement with cam 54, forcing the pawl 26 to drop to the position illustrated in FIG. 4 in which the finger 50 is removed from engagement with the end of coil spring 20 and disengaging the clutch as described above.

Thus, it will be seen that the unique drive mechanism provides for drive of a driven element only within a given temperature range by using a pair of bimetallic washers. One of the washers responds to temperatures below the predetermined range, and one of which responds to temperatures above the predetermined range. The engaging element or pawl in the device is so shaped as to be properly actuated by the outer edges of the bimetallic washers to provide for release and engagement of the wrapping coil spring clutch element 20 as is desired to maintain drive only within the given temperature range.

What is claimed is:

1. A thermally responsive drive mechanism for connecting a driving shaft to a driven pulley including a clutch surface on said shaft and a clutch surface on said pulley, a wrapping coil spring clutch element in engagement with both surfaces, an engaging pawl mounted adjacent said spring, a pair of bimetallic washer means in contact with said pawl, said pair of washer elements causing said pawl to cause said coil spring to connect said shaft and pulley in response to the temperature being within a predetermined range.

2. A mechanism as in claim 1 wherein one of said washers responds to temperatures above said predetermined range and one of said washers responds to temperatures below said predetermined range.

3. A mechanism as in claim 2 wherein said washers have an outer diameter in engagement with said pawl.

4. A mechanism as in claim 2 wherein said pawl has finger means movable into engagement with said coil spring to cause same to wrap about said surfaces.

5. A mechanism as in claim 3 wherein said surfaces, pawl, and washers are internal of said coil spring clutch element.

6. A mechanism as in claim 3 wherein said clutch surfaces are coaxial and comprise smooth cylindrical surfaces.

* * * * *